UNITED STATES PATENT OFFICE.

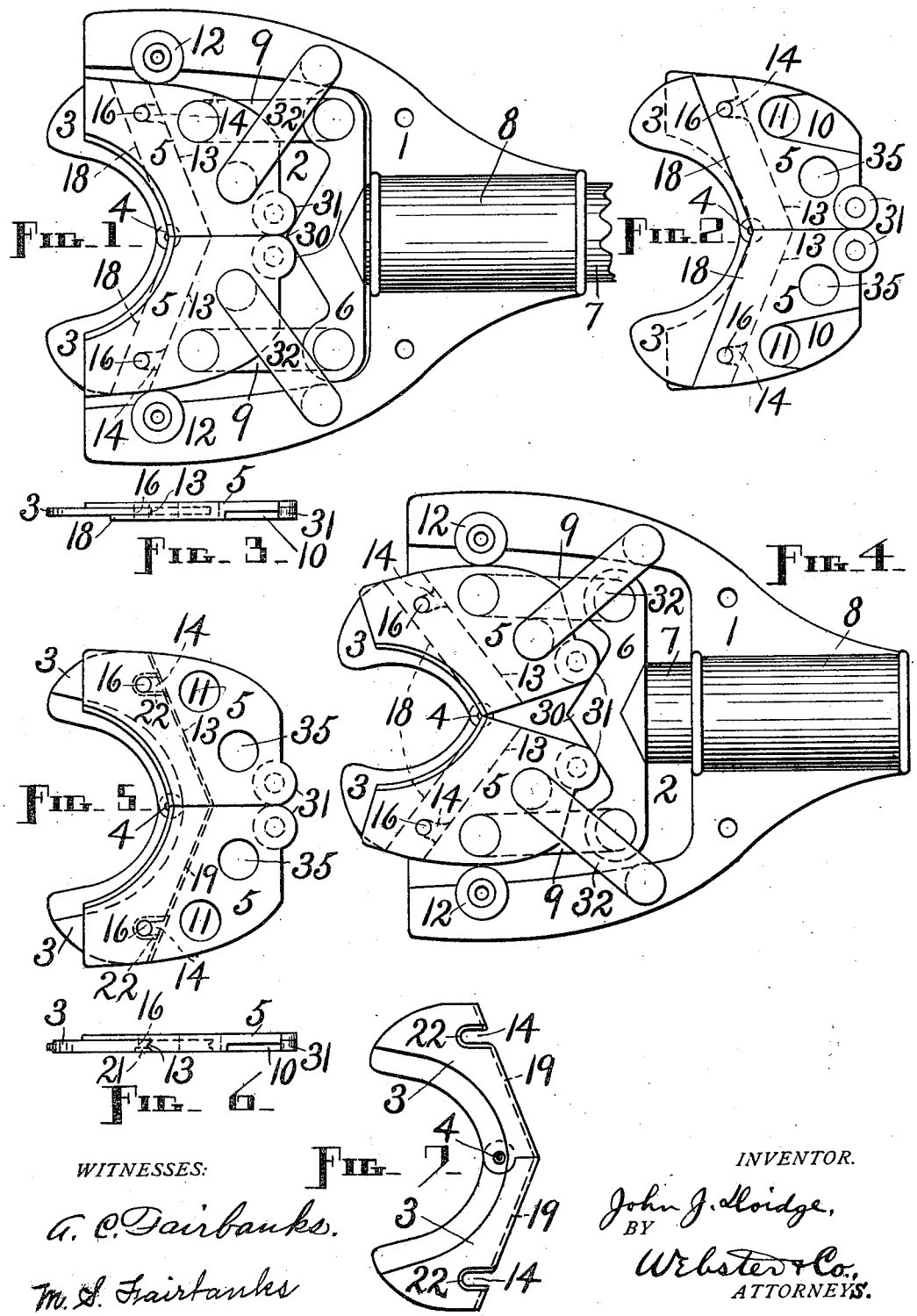

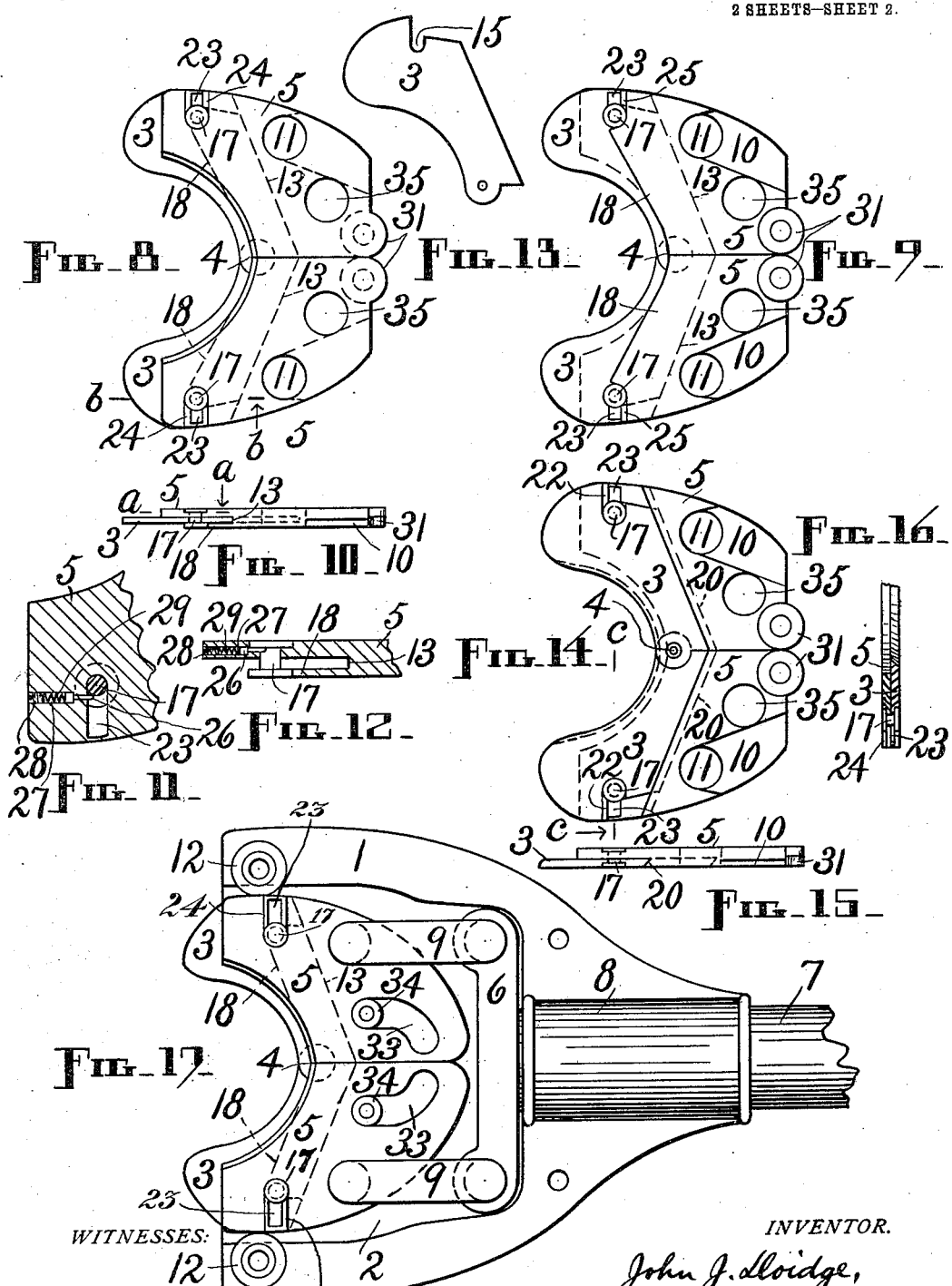

JOHN J. DOIDGE, OF SOUTH FRAMINGHAM, MASSACHUSETTS, ASSIGNOR, BY MESNE ASSIGNMENTS, TO R. H. LONG MACHINERY COMPANY, OF SOUTH FRAMINGHAM, MASSACHUSETTS, A CORPORATION OF CONNECTICUT.

WIPER FOR LASTING-MACHINES.

1,012,997. Specification of Letters Patent. Patented Dec. 26, 1911.

Application filed June 12, 1909. Serial No. 501,722.

*To all whom it may concern:*

Be it known that I, JOHN J. DOIDGE, a subject of the King of Great Britain, residing at South Framingham, in the county of Middlesex and State of Massachusetts, have invented certain new and useful Improvements in Wipers for Lasting-Machines, of which the following is a specification.

My invention relates to improvements in devices known as wipers and used in lasting machines for turning the upper of a boot or shoe over onto the insole on the last in readiness to be tacked or otherwise fastened to said insole and for holding such upper while being so fastened; and said invention resides more especially in wiper blades and holders therefor of certain peculiar construction, as hereinafter set forth.

The object of my invention is to produce strong and durable devices of this kind in which the wiper blades can be easily and quickly placed in the holders and removed therefrom, there being no bolts or screws to put in and take out as is the case with the type of wipers in common use.

Further objects are to provide wipers in which the blades are reversible, to afford firm and rigid holding means for the blades in every case, and to furnish a lasting machine with wipers that are capable of doing the work required of them in a most efficient manner.

I attain these and other objects, which will appear in the course of the following description, by the means illustrated in the accompanying drawings, in which—

Figure 1 is a top plan of a lasting machine wiper head equipped with a preferred form of my wiper and with the operating mechanism therefor; Fig. 2, a bottom plan of the wiper holders and blades; Fig. 3, a side edge view of the wiper members as they would appear if lifted out of the head in the first view; Fig. 4, a top plan of the parts shown in Fig. 1, illustrating their operation; Fig. 5, a top plan of a modified form of wiper members; Fig. 6, a side edge view of the same; Fig. 7, a plan of the wiper blades used in the Fig. 5 construction; Fig. 8, a top plan of still another modified form; Fig. 9, a bottom plan of the construction shown in the preceding view; Fig. 10, a side edge view of the latter; Fig. 11, an enlarged horizontal section on lines *a—a*, looking in the direction of the arrow, in Fig. 10; Fig. 12, an enlarged vertical section on lines *b—b*, looking in the direction of the arrow, in Fig. 8; Fig. 13, a plan of one of the wiper blades used in the Fig. 8 construction; Fig. 14, a bottom plan of the sliding-stud-provided holders previously shown, and non-reversible blades; Fig. 15, an edge view, looking down on the view above; Fig. 16, a front edge view in partial section on lines *c—c*, looking in the direction of the arrow, in Fig. 14, and, Fig. 17, a top plan similar to Figs. 1 and 8 excepting that in this last view the operating mechanism is slightly different.

Similar reference characters designate similar parts throughout the several views.

Before describing my invention in detail it may be well to state that the same embraces reversible and non-reversible and thin and thick wipers proper or wiper blades, also holders provided with fixed studs for engagement by such blades and others provided with movable studs for engagement with such blades. The reversible blades are generally preferred because the same pair can then be used for rights and lefts. Necessarily slight changes must be made in the construction of the holders for the different kinds of blades, but in the main and from a patentable standpoint what may be called primary elements are present in all cases. These wipers are equally adaptable either for McKay or turned work or for Goodyear or welted work, although the operating mechanism may be modified somewhat, if desired, so as to project or advance the holders with their blades a short distance before imparting the "wiping in" motion to them, for McKay shoes, such motion taking place or commencing to take place initially in the other case.

My wipers are no more expensive than others, and they are very economical because of the great saving in the number of blades that may be experienced by their use.

In the drawings, 1 represents one of the wiper heads of a lasting machine, without the cover plate, which is hollowed out or recessed at 2, open at the front end and with the central fore part of the bottom or floor cut out in the usual manner; 3—3 represent wiper blades having ordinary working edges and being pivoted together in the center at 4; 5—5 represent wiper-blade holders which are adapted to slide in said recess; 6 represents a cross-head in the recess at the inner end of an operating plunger 7, and 8 indicates a sleeve at the back end of the head 1 in and through which said plunger is reciprocated. The pivot 4, the meeting edges of the holders 5 when said holders are drawn in and normally or initially depressed, and the axis of the plunger 7 are all in the central vertical plane of the head 1. Two links 9 connect the ends of the crossheads 6 with the holders 5, such links being approximately parallel to each other when said holders are normally disposed in abutting relation one with the other. The holders are recessed at 10—10 in their undersides to accommodate the links 9, and have holes 11—11 for the pivot studs at the forward ends of said links. Two horizontal rollers 12 are suitably mounted on the head 1 near the front end to serve as anti-friction guides or abutments for the holders, the lateral edges of which holders bear and ride against such rollers as said holders are actuated forward and backward in the recess 2. In addition to these members, which will presently be considered more in detail, there are the means by which the blades 3 are attached to the holders 5 to be described, and other members of the holder-operating or -actuating mechanism to be explained.

The back edges of each pair of wiper blades 3, when said blades are swung on their pivot 4 so that the adjacent edges of the two blades abut throughout their entire length in the center, are at an angle of about 30° to each other; and each pair of holders 5 is provided with shoulders 13—13 which are set back from the front edges of said holders on the undersides thereof and exactly accord longitudinally with the aforesaid back edges of said blades. The blades may be thin and reversible, as shown in Figs. 1, 2, 3, 4, 8, 9, 10 and 13, or thick and reversible, as shown in Figs. 5, 6 and 7; or said blades may be thick and non-reversible, as shown in Figs. 14, 15 and 16. Each pair of blades has two slots 14 or two recesses 15 therein, the former opening near the ends through the back edges of the blades and the latter through the ends of said blades. The slots 14 receive into them vertical fixed studs 16 set in the undersides of some of the holders in front of the shoulders 13, and the recesses 15 receive into them vertical movable studs 17 with which others of the holders are equipped. These studs together with the shoulders securely fasten the blades to the holders and insure that every movement imparted to said holders shall be also imparted to said blades, while at the same time the construction and arrangement of parts are such that the blades can be very readily slipped out of engagement with the holders and as readily placed in operative position therein without employing any tool or implement whatever, the protruding front ends or other exposed portions of the blades being grasped to remove them and also to replace them. The advantage of this means of connection or attachment over screws or bolts is obvious.

In the first four views, and likewise in Figs. 8, 9, 10 and 12 or wherever thin wiper blades are employed, each shoulder 13 constitutes the back end of a horizontal channel cut in each holder from the front, so that there is a lip 18 which extends beneath the associated blade to assist said shoulder and the adjacent stud 16 or 17 in supporting and securing such blade in place. The lip 18 may be shorter than the top of the aforesaid channel, that is to say, it need not extend so far forward.

With the thick reversible wiper blades the holder shoulders 13 are V-shaped in cross-section, and the abutting edges of the wiper blades have similar grooves therein to receive such shoulders, as best shown in Fig. 6. The shape of the interlocking parts may vary from that specified above, provided such parts be so constructed that the shoulders properly engage and support the blades. The lips 18 are not here required, of course. The grooves in the blades are indicated at 19, in Fig. 7.

The non-reversible blades in Figs. 14, 15 and 16 have their rear edges undercut, as represented at 20, and the holder shoulders 13 are cut in to correspond so that good interlocking engagement between the parts is made possible. Obviously the blades cannot be reversed or turned over in these holders, as they can in each of the other examples.

The fixed studs 16, which are used with the thin blades 3, are so set in the holders 5 that they intersect the channels, formed by the lips 18 with the thin portions of said holders above, and are in proper positions relative to the slots 14 in said blades. In this connection see Figs. 1, 2 and 3.

The fixed studs 16, which are used with the thick reversible blades 3 and might be used with the non-reversible blades, depend from the holders 5, Figs. 5 and 6, and have heads 21 at their lower ends to support or assist in supporting said blades, in place of the lips 18. The slotted portions of the blades 3 are countersunk as at 22—22, Fig. 7, both top and bottom if the blades be of the reversible type and on the bottom only if the blades be of the non-reversible type, to receive the heads 21 of the studs 16 while the slots 14 receive the shanks of said studs. As just intimated these headed studs can be employed with the non-reversible blades by providing the latter with slots 14 having countersunk edges 22 underneath. The object of countersinking the edges of the slots 14 is to allow the bottoms of the heads 21 of the studs 16 to be flush with the undersides of the blades engaged and supported thereby. The edges of the recesses 15 in the thick blades should be countersunk in the same way and for the same reason, the bottom heads on the movable studs 17 being the ones which in the last case are received into the countersunk places 22, Fig. 14.

The movable studs 17 are double-headed and have their shanks inserted in slots 23 in each pair of holders 5 that is provided with such studs. The slots 23, which extend laterally in their holders near the side edges thereof, are closed at both ends. These studs, like all of the other studs, are in front of the shoulders 13, and their positions enable them to be pushed inward toward each other and to then enter the recesses 15 in the blades 3, provided a pair of blades be in place against said shoulders—see Figs. 8, 9, 10, 14 and 15. The top edges of the slots 23 are countersunk, as at 24, in Fig. 8, for the upper heads of the studs 17; and, as in Fig. 9, the lips 18 are cut away on lines 25—25 to accommodate the bottom heads of said studs.

Preferably a horizontal spring-pressed pin 26 is arranged in each holder which has a movable stud 17, to retain such stud in its inner operative or locking position. As shown in Figs. 11 and 12, each locking pin 26 is in a passage 27 pierced through the holder in which it is located from the front end thereof to the slot 23 in said holder, said pin and said passage are shouldered so that the inner end of said pin can protrude only a little way into said slot, a screw 28 closes the outer end of said passage, and a spring 29 is interposed between the adjacent ends of said screw and pin.

Before inserting a pair of blades into a pair of holders provided with the studs 17, said studs must be positioned in the outer ends of the slots 23, and then, after placing said blades in said holders with the back edges of the former against the shoulders 13 of the latter, the studs are moved inward as far as the inner ends of said slots will permit, the springs 29 yielding as the studs snap past the protruding terminals of the pins 26 in the slots. The pins 26, under the influence of their springs, shoot into the slots 23 as soon as the studs 17 pass them and so hold said studs in engaging relation with the blades. The studs 17 are now in the blade recesses 15 and between the inner ends of the slots 23 and the pins 26, and the blades are thus securely held in place in their holders. When it is desired to remove the blades from this last connection, the studs 17 are forced by the pins 26 into the outer ends of the slots 23 and the blades are taken from their holders in the same manner as previously described.

It is necessary to turn the wiper blades as well as to advance them, and to this end I may make provision for their advance, as clearly shown in Figs. 1 and 4, or I may make provision for swinging them only at the forward end of their travel, as in Fig. 17. In the first instance, the cross-head 6 is provided with an angular front projection 30, the front edges or faces of which bear at all times on two horizontal anti-friction rollers 31 carried by the associated holders 5 underneath the same at their adjacent rear corners, and two links 32 which cross the links 9 are employed, the adjacent ends of said links 32 being pivotally attached to said holders and the opposite ends of said links to the head 1; and in the second instance, the holders have two cam-slots 33 in which are two horizontal anti-friction rollers 34 suitably mounted on the bottom of the recess 2 of the head, said slots each having two branches and being so formed that, when said holders are drawn in and abut each other, the front branches of said slots are parallel and the rear branches converge or approach each other.

35 represents a hole in each of the holders 5, with which the links 32 are connected, for the pivot stud at the inner end of one of such links.

Referring to Fig. 1 and assuming that the plunger is actuated to the left, it will be perceived that the connected cross-head 6 advances the holders 5 and their blades 3, through the medium of the links 9, and that it also separates said holders and blades with its projection 30 which enters between the rollers 31, the holders and blades swinging on the pivot 4 to open behind and close in the working front portions of said blades so that they perform the wiping operation for which they are designed. At the end of the inward movement of the plunger 7, the parts stand as shown in Fig. 4. The plunger carries said parts back and restores them to initial position upon its return stroke.

Referring to Fig. 17 and assuming that the plunger 7 is actuated inward, it is clear that the holders 5 with their blades are thrust toward the open end of the head 1, by the cross-head 6 and connecting links 9, and advanced some little distance without separating, such distance corresponding to the lengths of the parallel branches of the cam-slots 33, such branches at this time serving merely to guide or assist in guiding the holders in a straight course; as soon, however, as the convergent branches of said slots arrive at the rollers 34 said holders and blades are thereby caused to open on the pivot 4 as before, the working portions of said blades then being drawn in to perform the wiping act. On the return stroke of the plunger the parts are retracted and once more disposed normally.

What I claim as my invention, and desire to secure by Letters Patent, is—

1. A wiper, for lasting machines, comprising wiper holders having backing shoulders and slotted overhanging parts forward of such shoulders, movable holding studs mounted in the slots in said overhanging parts and extending in front of said shoulders, and pivotally-connected wiper blades having rear edges adapted to bear against said shoulders and indentations to receive said studs.

2. A wiper, for lasting machines, comprising wiper holders having backing shoulders and provided with laterally movable holding studs and with yielding locking and releasing means for such studs, and pivotally-connected wiper blades having rear edges adapted to bear against said shoulders and indentations to receive said studs.

3. A wiper, for lasting machines, comprising wiper holders channeled to form backing shoulders and supporting lips and provided with movable holding studs, such lips being slotted and such studs being mounted in the slots therein and extending in front of said shoulders, and pivotally-connected wiper blades adapted to fit into the channels in said holders with the rear edges of said blades against said shoulders and having indentations to receive said studs.

4. A wiper for lasting machines, comprising wiper holders channeled to form backing shoulders and supporting lips and provided with movable holding studs and with yielding locking and releasing means for such studs, and pivotally-connected wiper blades having rear edges adapted to fit the channels in said holders with the rear edges of said blades against said shoulders and having indentations to receive said studs.

5. The combination, of a suitable wiper head provided at or adjacent to its front end with abutments for the lateral edges of wiper holders, wiper holders slidingly mounted in said head between said abutments, said holders being provided with backing shoulders and holding studs, pivotally-connected wiper blades having rear edges adapted to bear against said shoulders and indentations to receive said studs, and mechanism connected with the holders and arranged to actuate the same and maintain their lateral edges in contact with said abutments as the holders are moved out and in.

6. The combination, of a suitable wiper head, wiper holders in said head, said holders being provided with backing shoulders and holding studs, pivotally-connected wiper blades having rear edges adapted to bear against said shoulders and indentations to receive said studs, a cross-head, connecting means between said cross-head and said holders, abutments carried by the wiper head for the lateral edges of the holders, and means to cause the holders with their blades to swing on the blade pivot, with the lateral edges of said holders against said abutments, when said cross-head is actuated and said holders are moved out and in between said abutments.

7. The combination, of a suitable wiper head provided with abutments for the lateral edges of wiper holders, wiper holders in said head between said abutments, said holders being provided with backing shoulders and holding studs, pivotally-connected wiper blades having rear edges adapted to bear against said shoulders and indentations to receive said studs, and means to so actuate said holders with their blades that they swing or turn on the blade pivot during only part of their travel.

JOHN J. DOIDGE.

Witnesses:
RICHARD H. LONG,
EUGENE A. CLARK.

Copies of this patent may be obtained for five cents each, by addressing the "Commissioner of Patents, Washington, D. C."

Correction in Letters Patent No. 1,012,997.

It is hereby certified that the assignee in Letters Patent No. 1,012,997, granted December 26, 1911, upon the application of John J. Doidge, of South Framingham, Massachusetts, for an improvement in "Wipers for Lasting-Machines," was erroneously described and specified as "R. H. Long Machinery Company," whereas, said assignee should have been described and specified as *The R. H. Long Machinery Company;* and that the said Letters Patent should be read with this correction therein that the same may conform to the record of the case in the Patent Office.

Signed and sealed this 13th day of February, A. D., 1912.

[SEAL.]

C. C. BILLINGS,

*Acting Commissioner of Patents.*